United States Patent [19]
Roberts

[11] 3,805,075
[45] Apr. 16, 1974

[54] IMAGE-DISSECTING CHERENKOV DETECTOR FOR IDENTIFYING PARTICLES AND MEASURING THEIR MOMENTUM

[75] Inventor: Arthur Roberts, Lombard, Ill.

[73] Assignee: The United States of America as represented by the United States Atomic Energy Commission, Washington, D.C.

[22] Filed: Mar. 13, 1973

[21] Appl. No.: 340,808

[52] U.S. Cl............... 250/366, 250/368, 250/369, 250/397
[51] Int. Cl. .............................................. G01t 1/22
[58] Field of Search ........... 250/361, 362, 363, 366, 250/368, 369, 396, 397

[56] References Cited
UNITED STATES PATENTS
3,049,619  8/1962  Genovese, Jr. ..................... 250/362
3,140,394  7/1964  Roberts.............................. 250/368

Primary Examiner—Archie R. Borchelt
Attorney, Agent, or Firm—John A. Horan; Arthur A. Churm; Donald P. Reynolds

[57] ABSTRACT

Charged atomic and subatomic particles in a beam are classified as to type and momentum range by a detector having a beam bender, a Cherenkov medium and a segmented optical system for generating electrical pulses corresponding to illumination of predetermined regions of Cherenkov circles. Analysis of the illuminated regions by electronic logic provides identifying signals for given particles and given ranges of momentum.

10 Claims, 8 Drawing Figures

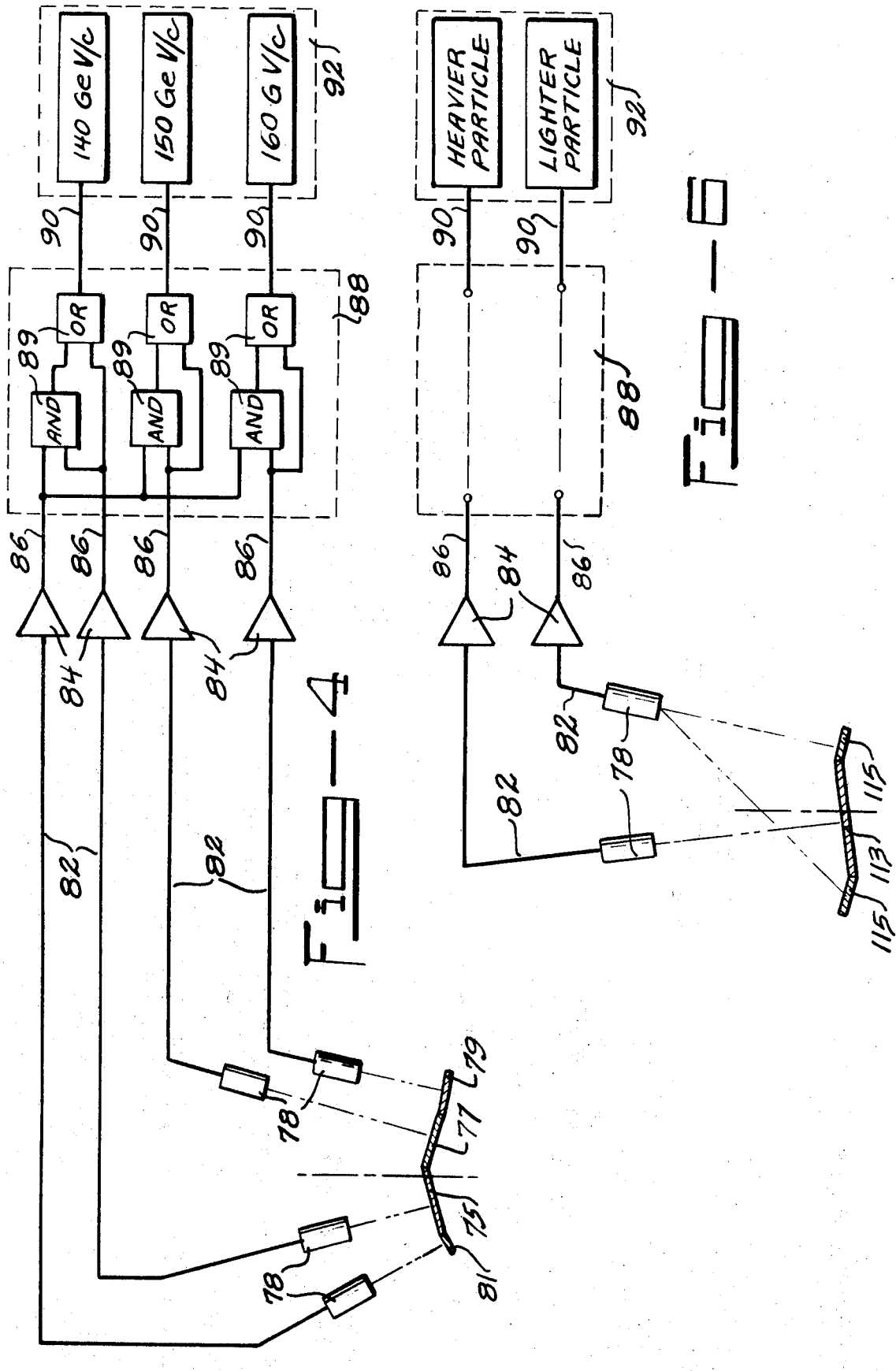

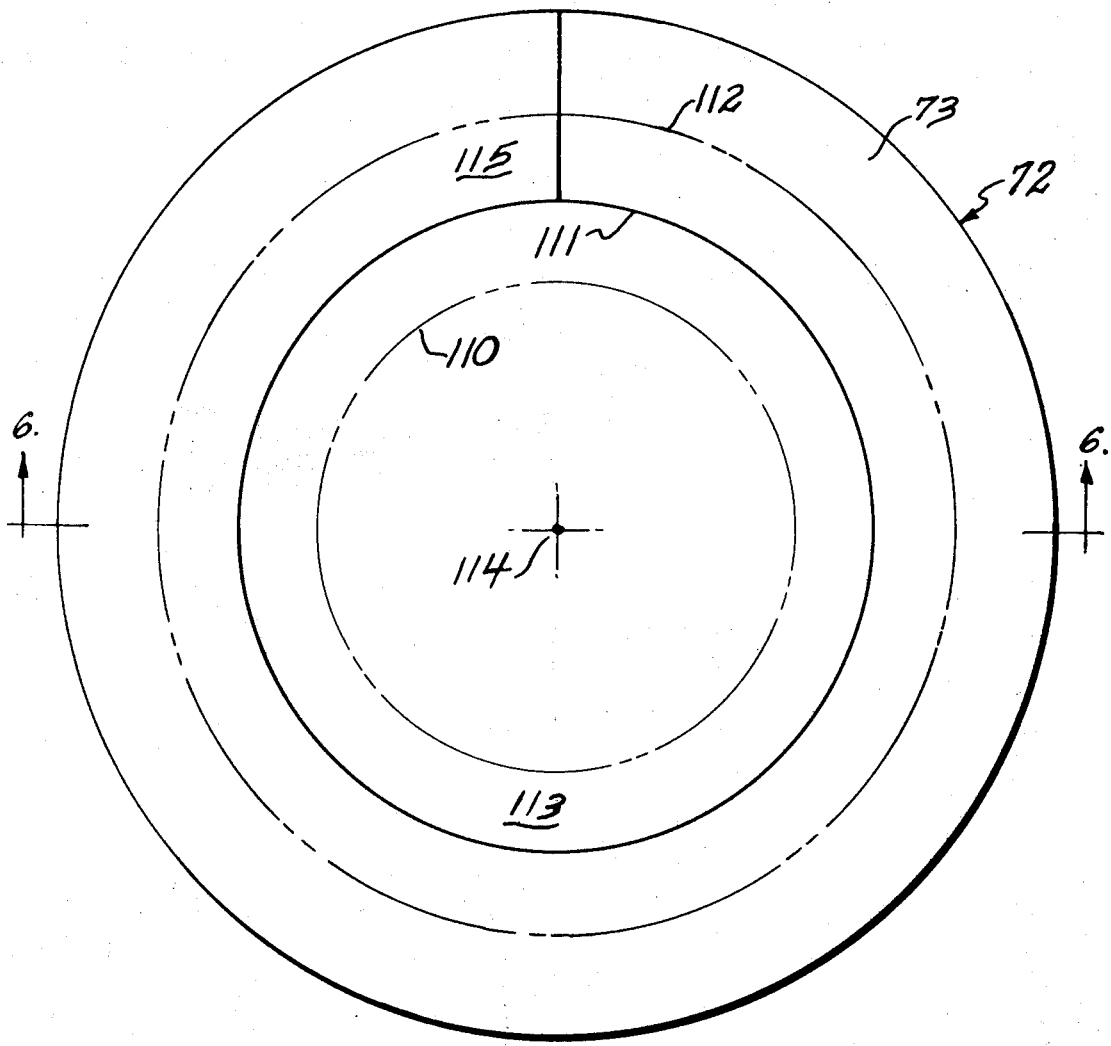

Legend:
------ 140 GeV/c
—·—·— 150 GeV/c
——— 160 GeV/c

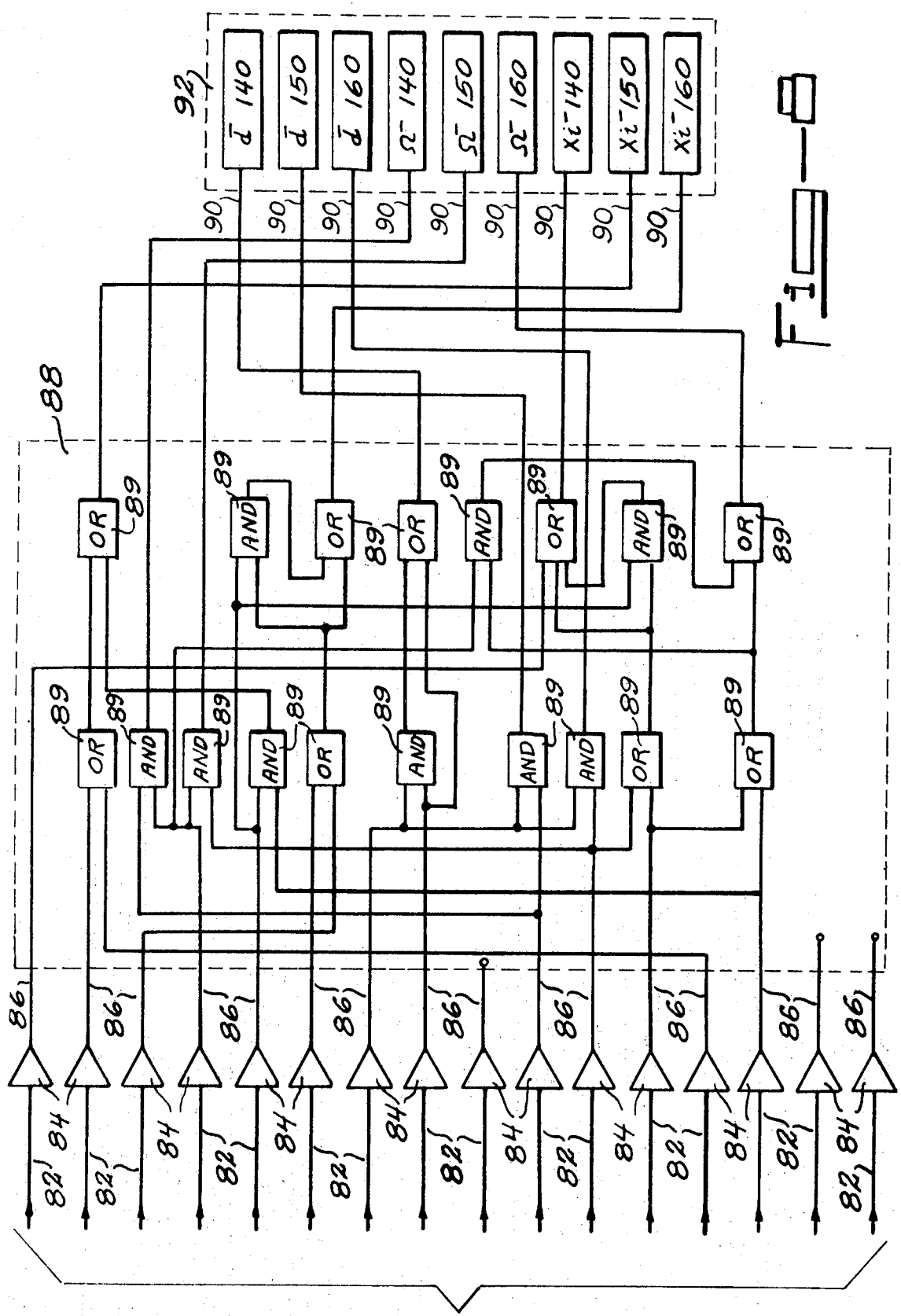

IMAGE-DISSECTING CHERENKOV DETECTOR FOR IDENTIFYING PARTICLES AND MEASURING THEIR MOMENTUM

CONTRACTUAL ORIGIN OF THE INVENTION

The invention described herein was made in the course of, or under, a contract with the United States Atomic Energy Commission.

BACKGROUND OF THE INVENTION

The present invention relates to the detection of atomic and subatomic particles in a particle beam. It is a Cherenkov counter adapted to provide information identifying particles and their momentum.

The Cherenkov counter is a well-known and important detector in high-energy physics. The basis of its operation is the Cherenkov effect, which is the emission of electromagnetic radiation by a charged particle traveling at a velocity greater than the velocity of light in a medium. This radiation, which is called Cherenkov radiation, is emitted in the directions comprising the rays of a circular cone, the Cherenkov cone. The angle formed by any ray of this cone with the axis of the cone is a function of the velocity of the charged particle. The Cherenkov radiation is often out of the visible spectrum, but there is frequently an excitation level for atoms of the Cherenkov medium that emits visible light in response to Cherenkov radiation. This visible light can then be detected by photomultipliers to indicate that a particle has traversed the Cherenkov medium at a velocity greater than that of light in the medium. Slower particles do not produce Cherenkov radiation, providing an often desirable selectivity against indications from low-speed particles. Measurement of the cone angle provides velocity information about the particles producing Cherenkov radiation.

A conventional Cherenkov counter comprises a chamber containing a Cherenkov medium, one or more photomultiplier tubes coupled optically to the Cherenkov medium, and the associated electronics necessary to register light input to the photomultipliers. Such a device was manifestly inadequate for resolving the information available in a 150 GeV/c hyperon beam at the National Accelerator Laboratory. This beam contained or could be expected to contain a number of negatively charged particles including omega hyperons, cascade hyperons (xi$^-$), sigma hyperons, antiprotons, antikaons, antipions, antideuterons, electrons, and muons. These particles could be expected to possess momenta in the range 130–170 GeV/c. It was desired to obtain prompt trigger signals identifying particular particles unequivocally. It was also desired to specify a range of momenta that included the momentum of the particle identified. No previously existing counter was capable of meeting these requirements.

It is an object of the present invention to provide a method and means for identifying atomic and subatomic particles.

It is a further object of the present invention to provide a method and means of distinguishing among different atomic and subatomic particles.

It is a further object of the present invention to provide a method and means of distinguishing among different values of momentum of atomic or subatomic particles.

It is a further object of the present invention to provide a prompt indication of the type and momentum range of an atomic or subatomic particle in a beam.

It is a further object of the present invention to provide a method and means of distinguishing among charged hyperons in a momentum range about 150 GeV/c.

It is a further object of the present invention to provide a method and means of identifying the type, presence, and momentum of various atomic and subatomic particles in a beam comprising many type of particles.

Other objects will become apparent in the course of a detailed description of the invention.

SUMMARY OF THE INVENTION

A method and means are provided to obtain a prompt indication of the presence of a particular one of a plurality of charged atomic or subatomic particles in a predetermined momentum range. The particles, formed into a beam, are bent into an angular spread that is a function of the momentum of the particles. The spread beam is then caused to be incident upon a Cherenkov medium, generating Cherenkov radiation through the passage of particles at a speed greater than the speed of light in the medium. The Cherenkov radiation is formed into an image of Cherenkov circles that vary in radius and in center location as a function of particle type and particle momentum. The image is dissected according to a predetermined pattern to obtain information about the radius and location of the center of each particular Cherenkov circle. Photomultipliers coupled optically to each dissected portion of the image produce electrical signals for analysis by electrical logical means to provide identifying signals for a plurality of particle types and momentum ranges.

BRIEF DESCRIPTION OF THE DRAWINGS

FIG. 4 is a partial sectional view of FIG. 3 and an associated electronic realization of logic.

FIG. 5 is a further set of Cherenkov circles as seen at an image-dissecting mirror.

FIG. 6 is a partial sectional view of FIG. 5 and an associated electronic circuit.

FIG. 8 is a partial sectional view of FIG. 7 and an associated electronic circuit.

DETAILED DESCRIPTION OF THE PREFERRED EMBODIMENT

Figure 1:
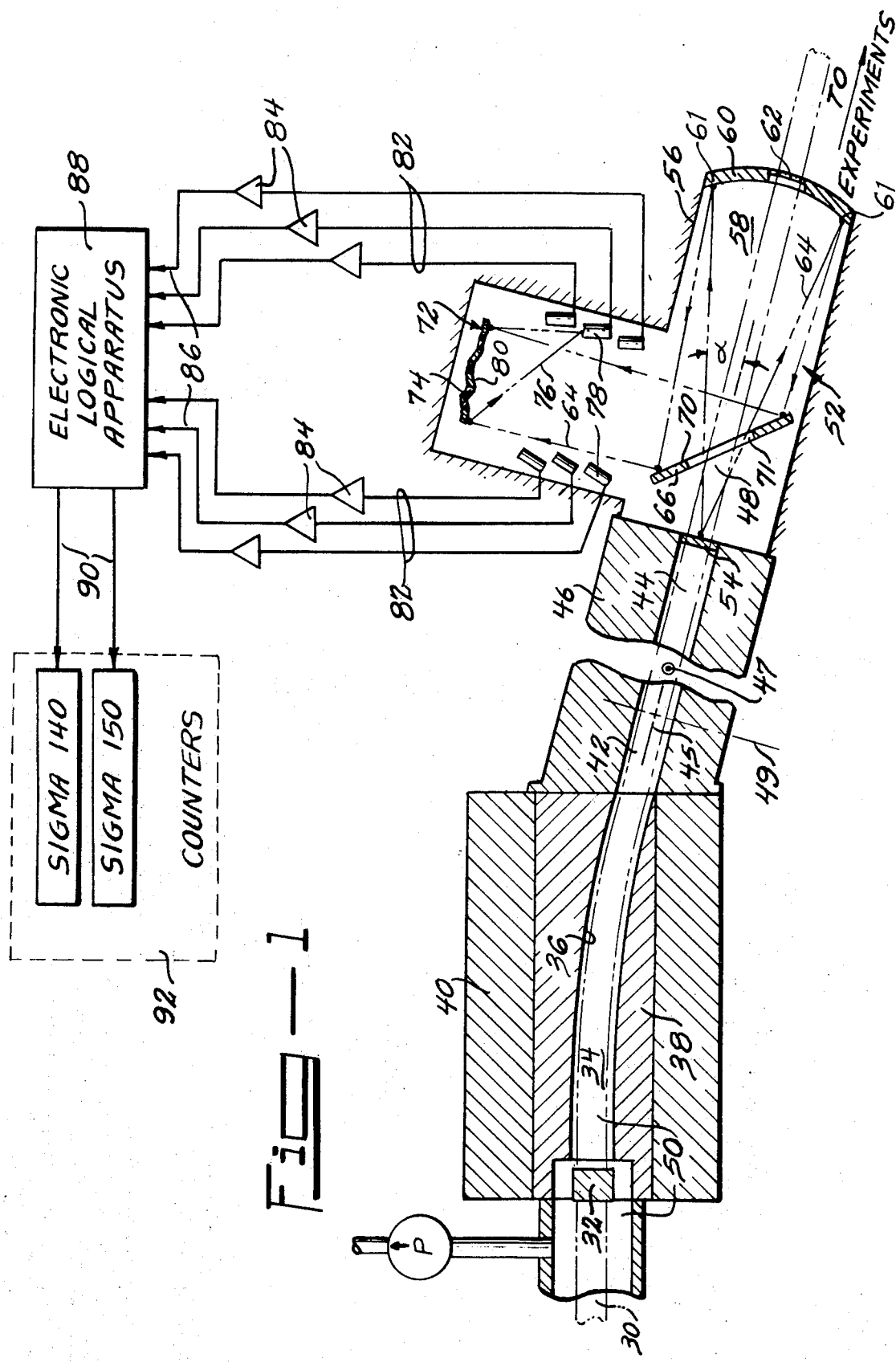
FIG. 1 is a partial sectional view and block diagram of an apparatus for the practice of the present invention.

FIG. 1 is a partial sectional view and block diagram of an apparatus for the practice of the present invention.

As stated, the present invention is directed to the recognition of types of particles and the resolution of their momentum. Such particles may be found in an accelerator beam as shown in FIG. 1 wherein a proton beam 30, exiting from an accelerator which is not shown, is caused to strike a target 32, resulting in an output beam 34 therefrom containing the various atomic and subatomic particles, including hadrons, leptons, deuterons, antideuterons, antiprotons, and protons not converted by the collision. The present invention operates to identify these particles and their momentum. It will be appreciated, however, that the present invention is not limited to such a particle beam, but is equally applicable to other particle beams containing a plurality of particles or a single particle exhibiting a range of momenta or a combination thereof.

The beam 34 comprising the aforementioned atomic and subatomic particles emerges from the target 32 and enters a channel 36 formed in a shield 38. Shield 38 is formed of a dense material to absorb particles not selected to pass through channel 36. Successful results have been achieved in absorbing such particles by using a dense alloy sold under the trademark Heavy-met. Shield 38 is disposed within bending means 40, which operates upon the particles in particle beam 34 to bend the beam 34 an amount that is a function of the momentum of the particles in beam 34. Bending means 40 may comprise an electrostatic particle deflector, a magnetic-field particle deflector, or other means for exerting a force upon a charged particle. If bending means 40 comprises a magnet generating a static magnetic field to deflect particles passing therethrough, the interaction of this magnetic field with the moving charged particles of particle beam 34 causes the charged particles to follow a path that is an arc of a circle. Channel 36 is formed to follow a path that is an arc of a particular circle. Since the radius of the circular path followed by a particular particle is a function of the particle momentum and the strength of a magnetic field perpendicular to the direction of motion of the particle, the particular arc selected for channel 36 forms in combination with the strength of the static magnetic field a particle-momentum selector. Particles in a selected momentum range are bent into a bent beam 44 and are thus transmitted through channel 36. Uncharged particles, particles having a charge opposite in sign to that of the selected particles, and particles having a momentum outside the selected range are allowed to collide with shield 38 where they are absorbed. Shield 38 thus acts as a beam stopper for that part of the beam 34 that is not selected.

Bent beam 44 proceeds in the directions taken by the selected particles. These directions comprise a very small angular spread about a straight line 45 that is the nominal direction of bent beam 44. The spread corresponds to the selected momentum range, because the particles having a higher momentum are bent less by bending means 40 than the particles having a lower momentum. Bent beam 44, after passing through the channel 36 of shield 38, enters a focusing device 46, which focuses the bent beam 44 in a plane perpendicular to the magnetic field of bending means 40 to produce a fanned beam 48. Fanned beam 48 exhibits an angular spread as a function of particle momentum. However, in the practice of the present invention the angular spread is only in the order of a few milliradians. Focusing device 46 is typically a set of two or more conventional quadrupole magnets, although other lenses would suffice.

Fanned beam 48 exits from focusing device 46 and enters a Cherenkov device 52 through a window 54. Cherenkov device 52 comprises an enclosure 56 containing a Cherenkov medium 58, a substantially transparent substance having an index of refraction greater than unity. Gases at controlled pressures, such as neon gas at a pressure of 1.65 atmospheres, providing a nominal index of refraction of 1.00011, are typically used as Cherenkov media 58. Neon is advantageous because it has a low amount of dispersion, or variation of refractive index with particle velocity. However, other gases or materials may be substituted for the Cherenkov medium 58. A spherical mirror 60 forms a portion of the Cherenkov device 52. Spherical mirror 60 is disposed in the path of fanned beam 48. A window 62 in the center of spherical mirror 60 is sized and located to permit egress of fanned beam 48 from Cherenkov device 52. Windows 62 and 54 are made of a material such as titanium to maintain the desired pressure and location of Cherenkov medium 58 and still permit fanned beam 48 to enter and exit from Cherenkov device 52 and proceed for further use as desired.

The passage of particles in fanned beam 48 through Cherenkov medium 58 at a velocity greater than the velocity of light in Cherenkov medium 58 produces Cherenkov radiation 64. This radiation is electromagnetic radiation produced in the shape of a cone of which the axis is the path of the particle producing the radiation and of which the cone angle $\alpha$ is a function of particle velocity. Where particular conical rays of Cherenkov radiation 64 intersect spherical mirror 60, Cherenkov circles 61 are generated. The radii of Cherenkov circles 61 are a function of cone angle $\alpha$ and the length of Cherenkov medium 58, which has previously been stated to be a function of the velocity of the particle producing the Cherenkov radiation. The centers of Cherenkov circles 61 are on the paths of the particles producing the Cherenkov radiation, which paths are fanned by bending means 40 into an angular spread as a function of particle momentum. The Cherenkov circles 61 thus contain information sufficient to identify the types of particles producing Cherenkov radiation and the momentum of these particles.

Analysis of Cherenkov circles 61 is performed by first reflecting light from Cherenkov circles 61 from spherical mirror 60 to a plane mirror 70. Plane mirror 70 has an opening 71 to permit unimpeded passage through plane mirror 70 of both fanned beam 48 and conically shaped Cherenkov radiation 64. Plane mirror 70 is angularly positioned so that light reflected by spherical mirror 60 is reflected from plane mirror 70 to an image-dissecting mirror 72 located within the enclosure 56 of Cherenkov device 52. Image-dissecting mirror 72 is located at the focus of spherical mirror 60 to receive therefrom a focused image of Cherenkov circle 61. Image-dissecting mirror 72 comprises a plurality of segments 74. Each segment 74 reflects a portion 76 of the light from a Cherenkov circle 61 incident upon a particular portion of image-dissecting mirror 72. Cherenkov circles 61, produced by different particles or by particles of different velocities, strike image-dissecting mirror 72 in different regions and are reflected from different segments 74. Segments 74 are constructed to reflect unique combinations of light from each of Cherenkov circles 61 for specific particles or energy ranges. Reflected light 76 proceeds from each mirror segment 74 to an associated photomultiplier tube 78, which generates an electrical signal in response to the incidence of such light. A cable 82 is connected to each photomultiplier tube 78 to carry the electrical signal generated in photomultiplier tube 78 to an associated amplifier 84. The output signal from each amplifier 84 is conducted by an associated cable 86 to an electronic logical apparatus 88. A predetermined logical analysis identifies signals from a particular combination of segments 74 with a particular Cherenkov circle 61 and hence a particular particle in a particular momentum range. Electronic logical apparatus 88 effects the predetermined logical analysis to perform the selection that identifies the Cherenkov circle 61 and hence the particle and momentum range associated with the Cherenkov circle. This selection results in an electrical signal that is transmitted through cable 90 to counters 92 for storage and display.

Figure 2:
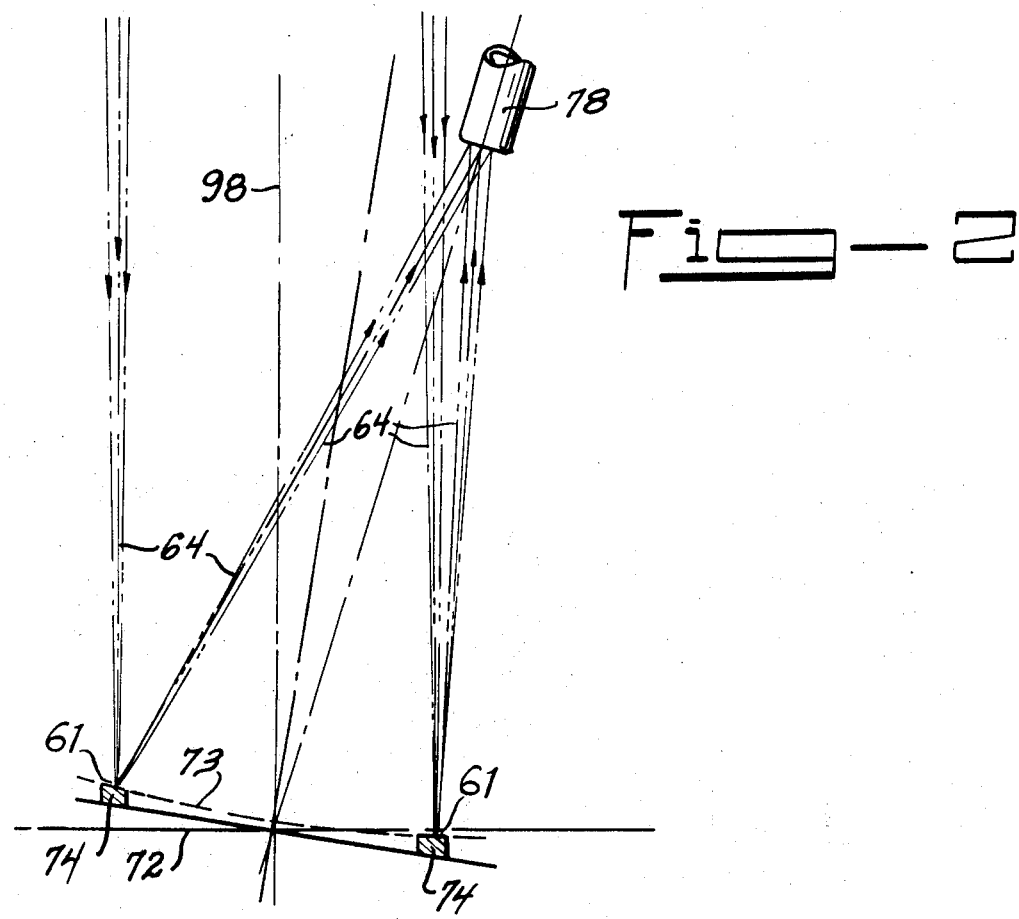
FIG. 2 is an expanded view of a portion of FIG. 1.

FIG. 2 is an expanded view of a portion of the enclosure 56 of Cherenkov device 52 of FIG. 1 associated with Cherenkov circle image dissection. In FIG. 2, rays of Cherenkov circles 61 generated by Cherenkov radiation 64 reflected from plane mirror 70 are incident upon image-dissection mirror 72. Image-dissection mirror 72, as stated, is comprised of a plurality of segments 74 forming surface 73. Each segment 74 is itself a mirror that is aimed at a particular photomultiplier tube 78 to reflect light from Cherenkov circles 61 from a particular portion of image-dissection mirror 72 to a particular photomultiplier tube 78. All photomultiplier tubes 78 are located about the axis 98 of reflected light of Cherenkov circles 61 a distance sufficient to avoid interference with the passage of the reflected light of Cherenkov circles 61 to image-dissecting mirror 72.

Figure 3:
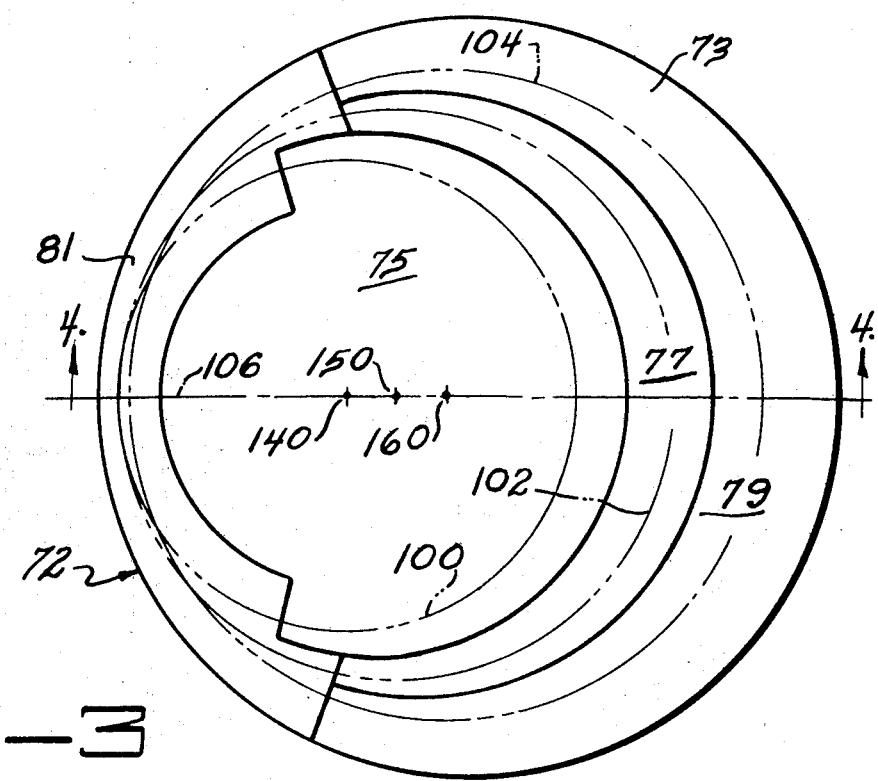
FIG. 3 is a set of Cherenkov circles as seen at an image-dissecting mirror.

Further understanding of the present invention may be had by referring to FIGS. 3, 4, and 5, which are circles of Cherenkov radiation or Cherenkov circles as focused at image-dissecting mirror 72 of FIG. 1. FIG. 3 shows Cherenkov circles for three different values of momentum for particles of the same type which thus have the same rest mass. Surface 73 is at the location of image-dissecting mirror 72. Cherenkov circle 100 on surface 73 is produced by a particular particle having a momentum of 140 GeV/c. Cherenkov circle 100 is centered at the spot marked 140 to identify it as the center of all Cherenkov circles produced by particles having a momentum of 140 GeV/c. Cherenkov circle 102 is larger in diameter than Cherenkov circle 100, and Cherenkov circle 102 is centered at the point marked 150 to indicate that it was produced by a particle having a momentum of 150 Gev/c. A further increase in momentum to 160 GeV/c for a particle of the same rest mass as the preceding two particles produces Cherenkov circle 104, which is larger than circles 100 and 102 and which has a center shifted farther along line 106. It can thus be clearly seen that particles having the same rest mass, but different energies, produce different Cherenkov circles of light at the surface 73 of image-dissecting mirror 72. Further understanding of the construction of the mirror 72 and the segments 74 thereof is obtained by considering the aforedescribed three typical Cherenkov circles 100, 102, and 104.

Cherenkov radiation-light is typically weak enough that it is important in the present invention, for detection purposes, to use as much as possible of the radiation. Accordingly, the entire surface 73 is divided into four regions numbered 75, 77, 79, and 81. Region 75 receives light only from Cherenkov circle 100. Thus, a mirror segment in the shape of region 75 would reflect light only from Cherenkov circle 100, providing a means of positive identification of passage of a particular particle having a momentum of 140 GeV/c. Similarly, region 77 receives light only from Cherenkov circle 102, enabling the identification of passage of a particle of the particular type being considered at a momentum of 150 GeV/c. Region 79 similarly receives light only from Cherenkov circle 104, providing information to identify a particle of the same type that produced Cherenkov circles 100 and 102, but having a momentum of 160 GeV/c. The identification process is accomplished by reflecting light from each of the regions 75, 77, and 79 to a different photomultiplier tube 78 for detection. Region 81 includes the balance of surface 73, including an area that is lit by all three Cherenkov circles 100, 102, and 104. Light from region 81 would thus not be useful by itself to aid in discriminating among particles in the three energy ranges, although light reflected from region 81 could be used in coincidence with light reflected from one of the regions 75, 77, or 79 to provide an increased total amount of light associated with passage of a given particle. This is known to increase the probability of detection of such an event. Segments 74 of mirror 72 shaped like regions 75, 77, 79, and 81 and aimed at different photomultipliers 78 provide identifying information to distinguish between particles in the three aforedescribed energy ranges with the same rest mass. The logic is as follows: regions 75 or (75 and 81) identify 140 GeV/c; regions 77 or (77 and 81) identify 150 GeV/c; regions 79 or (79 and 81) identify 160 GeV/c.

FIG. 4 is a partial sectional view of the mirror 72 of FIG. 3, taken along section lines 4—4, combined with an operational diagram of the apparatus necessary to implement the logic described above. In FIG. 4, mirror segments 75, 77, 79, and 81 are aimed to reflect light to different photomultiplier tubes 78, each of which is connected by a cable 82 to a separate amplifier 84. Amplified signals are conducted through cables 86 to electronic logical apparatus 88, comprising a plurality of gates 89. The gates 89 provide a routine implementation of the logic stated above, generating in each cable 90 an impulse to the appropriate counter 92 to identify passage of a particle having a particular momentum.

FIG. 5 is another view of Cherenkov circles as focused at surface 73 of mirror 72. In FIG. 5, Cherenkov circle 110 is produced by the passage of a particle of a particular mass and momentum. Cherenkov circle 112 is concentric with Cherenkov circle 110 and has a larger diameter than Cherenkov circle 110. This indicates that the particles producing both Cherenkov circles 110 and 112 have the same momentum, which is associated with point 114, the center of the circles. The larger diameter of Cherenkov circle 112 indicates that the velocity of the particle producing Cherenkov circle 112 is greater than the velocity of the particle producing Cherenkov circle 110. Since the momenta of these two particles are known to be the same, the particle producing Cherenkov circle 112, the larger of the two circles, is lower in rest mass than the particle producing the smaller Cherenkov circle 110. Line 11 thus divides surface 73 into two regions, 113 and 115. Region 113 contains Cherenkov circle 110 and region 115 contains Cherenkov circle 112. Segments 74 of mirror 72 shaped like regions 113 and 115 and aimed at different photomultipliers 78 provide identifying information to distinguish between passage of a particle of the rest mass producing Cherenkov circle 110 and a particle of the rest mass producing Cherenkov circle 112.

A possible identifying logic is as follows: region 113 identifies a heavier particle of the type producing Cherenkov circle 110; region 115 identifies a lighter particle of the type producing Cherenkov circle 112.

FIG. 6 is a partial sectional view of the surface 73 of mirror 72 of FIG. 5 together with the electronic equipment necessary to identify particles. In FIG. 6, mirror segments 113 and 115 reflect incident Cherenkov radiation to different photomultipliers 78. Cables 82 connect the resulting signals to separate amplifiers 84 and thence by cables 86 to electronic logical apparatus 88, which here serves only to pass signals straight through to implement routinely the logic stated above. Cables 90 conduct signals to counters 92 to identify the passage of a heavier or a lighter particle.

Figure 7:
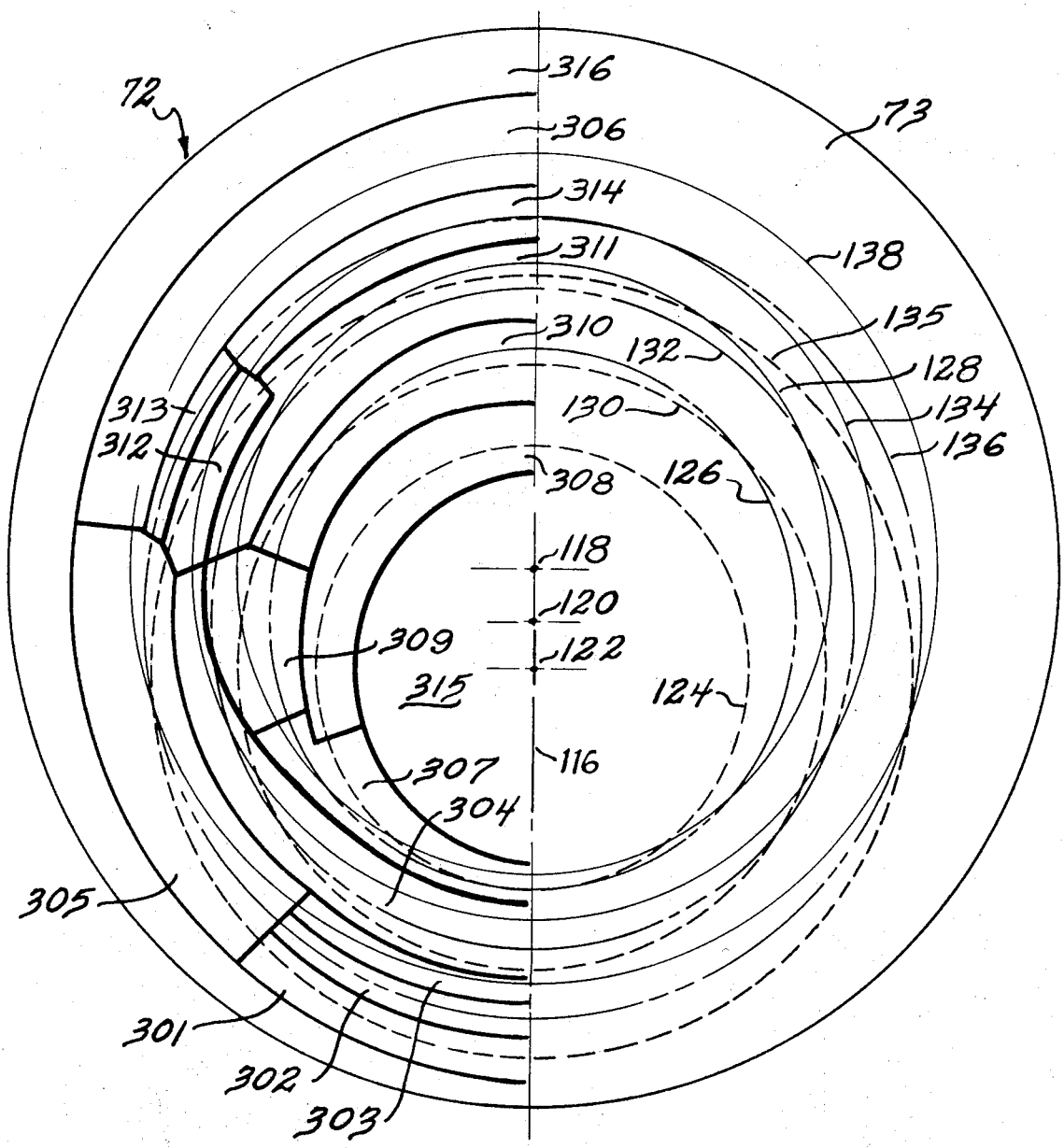
FIG. 7 is a further set of Cherenkov circles.

FIG. 7 is a view of Cherenkov circles produced at surface 73 for three particle types at three values of momentum. Line 116 contains the centers of all Cherenkov circles, which are at point 122 for particles having a momentum of 140 GeV/c; point 120, 150 GeV/c; and point 118, 160 GeV/c. Cherenkov circles 124, 126, and 128 are produced by antideuterons, as follows: Cherenkov circle 124 is produced by an antideuteron having a momentum of 140 GeV/c; Cherenkov circle 126, antideuterons at 150 GeV/c; and Cherenkov circle 128 antidueterons at 160 GeV/c. Cherenkov circles 130, 132, and 134 are produced by omega-minus hyperons, as follows: Cherenkov circle 130 is produced by an omega-minus hyperon having a momentum of 140 GeV/c; Cherenkov circle 132, omega-minus hyperons at 150 GeV/c; Cherenkov circle 134, omega-minus hyperons at 160 GeV/c. Cherenkov circles 135, 136, and 138 are produced by negative cascade hyperons or xi-minus hyperons, as follows: Cherenkov circle 135 is produced by a xi-minus hyperon having a momentum of 140 GeV/c; Cherenkov circle 136, xi-minus hyperons at 150 GeV/c; Cherenkov circle 138, xi-minus hyperons at 160 GeV/c. The upper half of surface 73 is divided into 16 regions, numbered from 301 through 316, to facilitate selections of coincidences of illumination to identify particles. The lower half of surface 73 is symmetrical and is not shown. The principles of this division are: (1) use as large as possible a section for an area lit by a single Cherenkov circle; (2) collect in a single section the intersections of a plurality of circles; (3) use as few sections as are consistent with identification; and (4) insure that the sections chosen provide unique twofold coincidences for each particle and momentum range to be identified. Identification of particles is then carried out as illustrated for the following two examples, with appropriate segments 74 of mirror 72 shaped the same as the described regions and each aimed at an associated photomultiplier 78. Referring to FIG. 7, Cherenkov circle 124 illuminates regions 307 and 308. No other Cherenkov circle illuminates both regions 307 and 308. Thus, light reflected from regions 307 and 308 into associated photomultiplier tubes 78 will generate signals capable of identifying an antideuteron at 140 GeV/c, the particle that produced Cherenkov circle 124. Similarly, Cherenkov circle 135 illuminates regions 301, 305, 312, and 311. Of these, only region 301 is unique to Cherenkov circle 135. Regions 305 also contains portions of Cherenkov circles 136 and 138. Region 312 also contains a portion of Cherenkov circle 134. Region 311 also contains portions of Cherenkov circles 128 and 132. Standard coincidence and anticoincidence techniques facilitate identification of circles with maximum probability. For example, using twofold coincidences for shared regions, an obvious identification scheme to detect the presence of a xi-minus hyperon at 140 GeV/c that would produce Cherenkov circle 135 is the following: region 301 or (region 305 and region 311) or (region 305 and region 312) or (region 311 and region 312). This and the other logical combinations necessary to identify particles are shown in Table I, using the following principles. Unambiguous indications are used alone, such as region 301 for the xi-minus hyperon at 140 GeV/c. Shared twofold coincidences are not used; for example, the coincidence of regions 309 and 310 is associated with both the anitdeuteron at 160 GeV/c and the omega-minus hyperon at 140 GeV/c, so this coincidence does not appear in Table I. Finally, unique coincidences are used, such as regions 305 and 314 which in combination are unique to the xi-minus hyperon at 150 GeV/c.

TABLE I

| Particle and momentum | | Segments lit | Logic |
|---|---|---|---|
| Antideuteron | 140 | 307, 308 | 308+(307·308) |
| | 150 | 307, 309, 310 | 307·310 |
| | 160 | 307, 309, 311 | 307·311 |
| Omega minus | 140 | 304, 309, 310 | 304·310 |
| | 150 | 304, 309, 311 | 304·311 |
| | 160 | 304, 312, 314 | 304·(312+314)+(312·314) |
| Xi minus | 140 | 301, 305, 311, 312 | 301+305·(311+312)+(311·312) |
| | 150 | 302, 305, 313, 314 | 302+313+(305·314) |
| | 160 | 303, 305, 306 | 303+306+305·(303+306) |

FIG. 8 is a combined diagrammatic sectional view of the mirror of FIG. 8 and an operational diagram of an electronic implementation of the logic necessary to realize the logic of Table I. In FIG. 8, mirror 72 comprises 16 segments numbered 301–316, each aimed at a different photomultiplier 78. Each signal proceeds by a cable 82 to an amplifier 84 and thence by a cable 86 to electronic logical apparatus 88. Here, gates 89 realize the logic of Table I to generate output signals in cables 90 that are connected to counters 92 to identify separate particles and momentum ranges in the same order in which these particles and momentum ranges are listed in Table I.

With the above-described embodiments, the present invention may be utilized to identify particular particles of interest with operating parameters wherein a. the focusing device 46 comprises a double quadrupole magnetic lens;

b. photomultipliers 78 comprise RCA 4517 end-window bialkali tubes;

c. Cherenkov medium is neon gas having a pressure of 1.65 atmospheres and a length of 5 meters;

d. mirror 60 is a spherical mirror 6 inches in diameter, with a focal length of 5.5 meters;

e. image-dissecting mirror 72 is approximately 8 inches in diameter.

The parameters of these embodiments are illustrative, and are not therfore to be taken as a limit upon the invention. Persons skilled in the art will be aided by the teachings herein to adapt the principles of this invention to other embodiments. The scope of the protection afforded should therefore be limited only by the appended claims.

The embodiments of the invention in which an exclusive property or privilege is claimed are defined as follows:

1. An apparatus for identifying the type of particle and the momentum of charged atomic and subatomic particles comprising:

means for selectively positioning said particles into a beam, according to the momentum thereof;

means intercepting said beam to generate therefrom Cherenkov radiation;

means for generating from said Cherenkov radiation Cherenkov circles, each of said Cherenkov circles being associated with a particular particle type and particle momentum; and means for identifying each of said Cherenkov circles and hence each of said particles and the momentum of each of said particles.

2. The apparatus of claim 1 wherein said means for selectively positioning said particles comprise a bending magnet positioned to accept and subject said particles to the magnetic field thereof and effect momentum positioning of said particles in a beam and a quadrupole focusing magnet accepting said particle beam to focus said beam into a fan shape.

3. The apparatus according to claim 1 wherein said Cherenkov circle generating and identifying means comprise means intercepting said Cherenkov radiation to image said Cherenkov radiation and generate therefrom Cherenkov circles each associated with a particular particle type and particle momentum; a mirror; means for focusing each of said Cherenkov circles on the reflecting surface of said mirror, the reflecting surface of said mirror comprising a plurality of segments spatially arranged relative each other to selectively reflect portions of each of said Cherenkov circles; means for detecting each of said reflected Cherenkov circle portions; and means for combining each of said detected Cherenkov circle portions to identify each of said Cherenkov circles and hence said particles and the momentum thereof.

4. The apparatus according to claim 1 wherein said means for generating Cherenkov circles and for identifying said particles comprise:

an enclosure accepting said focused beam;

a medium having an index of refraction greater than unity disposed in said enclosure in the path of said focused beam and generating therefrom Cherenkov radiation;

mirror means disposed intercepting said Cherenkov radiation to generate therefrom Cherenkov circles and to direct radiation from portions of said Cherenkov circles in a plurality of directions;

radiation-detecting means disposed to detect said radiation from each of said directions;

electrical counting means coupled to said radiation-detecting means to provide a count of radiation detected, which count provides identification of the type and momentum of said particles.

5. The apparatus according to claim 1 wherein said means of generating and identifying Cherenkov circles comprise:

a first spherical mirror positioned to reflect and focus said Cherenkov radiation;

a planar mirror disposed in the path of said particle beam, said planar mirror having an aperture to permit passage of said particle beam, said mirror adapted to reflect said once-reflected Cherenkov radiation from said first spherical mirror;

a second spherical mirror disposed substantially at the focus of said twice-reflected Cherenkov radiation, said second spherical mirror having a plurality of segments, said segments being aimed at a plurality of detectors to focus Cherenkov radiation from each element to a detector to provide identifying information about said Cherenkov circles.

6. A method of identifying the type and momentum of particles comprising:

positioning said particles selectively into a beam according to the momentum of said particles;

generating Cherenkov radiation from said beam;

generating Cherenkov circles from said Cherenkov radiation;

identifying said Cherenkov circles and hence each of said particles and the momentum of each of said particles.

7. The method of claim 6 wherein said step of identifying said Cherenkov circles comprises the steps of:

forming the images of said Cherenkov circles on an image-dissecting mirror;

reflecting portions of said images from said image-dissecting mirror to different detectors to generate electrical signals;

combining said electrical signals to provide identification of type and momentum of said particles.

8. The method of claim 6 wherein the steps of generating Cherenkov radiation and of generation of Cherenkov circles from said Cherenkov radiation comprises the steps of:

directing said particles into a Cherenkov medium to generate Cherenkov radiation;

intercepting said Cherenkov radiation with a spherical mirror;

and focusing the reflection from said spherical mirror, which focused reflection comprises Cherenkov circles.

9. The method of claim 6 wherein the step of positioning said particles comprises directing said beam into a static magnetic field having a direction perpendicular to the beam.

10. The method of claim 6 wherein the steps of identifying said Cherenkov circles comprise the steps of focusing said image on an image-dissecting mirror comprising a plurality of segments, each such segment receiving a portion of said image; aiming each of said segments at a different detector; and generating an output from each of said detectors in response to said portion of Cherenkov radiation incident thereon, which output identifies the momentum and type of particle in said beam.

* * * * *